March 3, 1964 H. LEMMER 3,123,250
DUAL SECTION RUPTURING DISC
Filed June 18, 1962
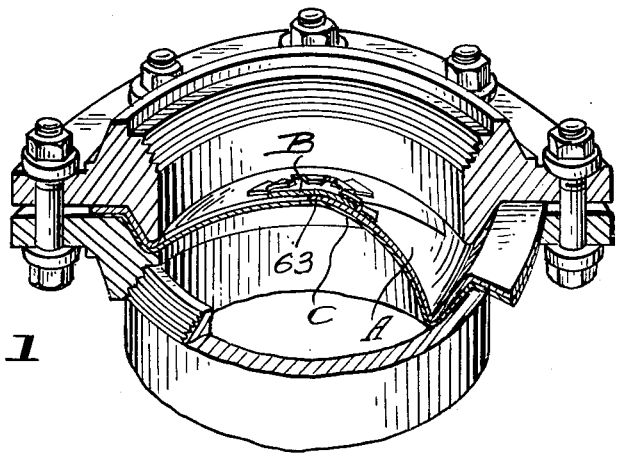
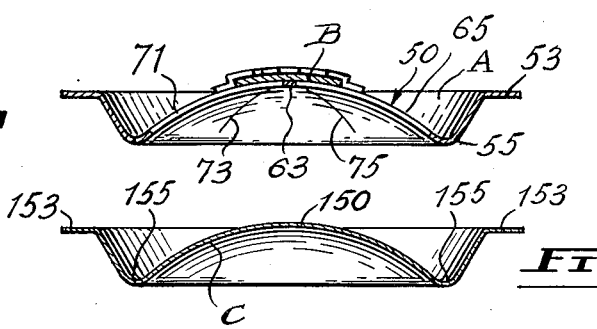
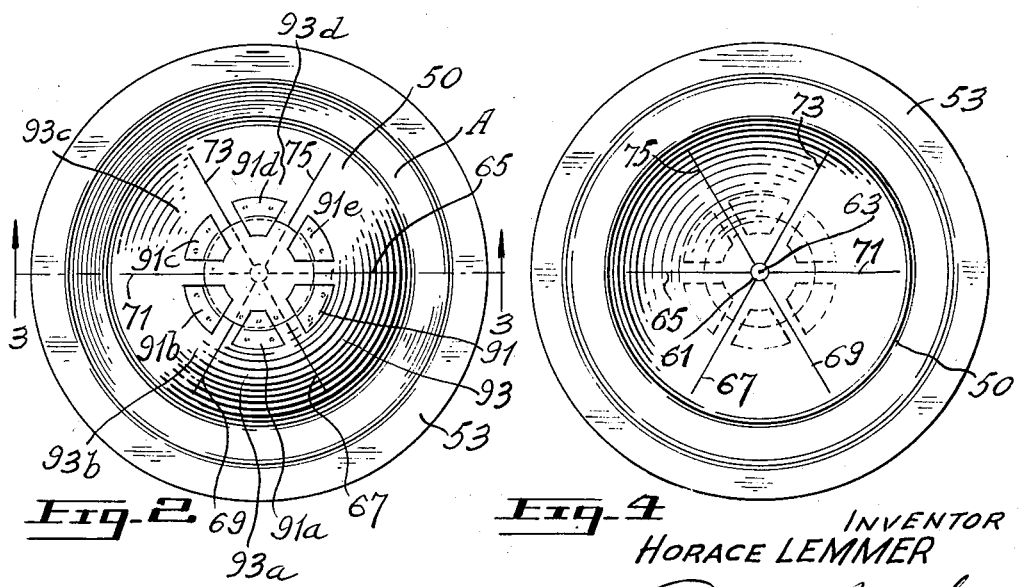
INVENTOR
HORACE LEMMER
BY
ATTORNEY United States Patent Office 3,123,250
Patented Mar. 3, 1964

3,123,250
DUAL SECTION RUPTURING DISC
Horace Lemmer, 13 Decarie Place, Dorval,
Quebec, Canada
Filed June 18, 1962, Ser. No. 203,329
Claims priority, application Canada June 29, 1961
5 Claims. (Cl. 220—89)

This invention relates to the overpressure protection of pressure vessels, associated piping or complete pressurized systems.

More particularly, the invention provides a rupture disc assembly specifically designed to give longer service life for extreme temperatures and/or corrosive conditions and/or positive or negative fluctuating pressures. The invention also provides an improved form of rupture disc support.

The single piece prebulged rupture disc (sometimes used in combination with a vacuum support where negative pressure is also used) is considered a standard with simple or slow pressure build-up systems at approximately normal temperatures. But it has not provided the life service required under present and more exacting pressurized systems with fast positive and/or negative pressure cycles, particularly where these latter conditions operate in extreme temperature and/or corrosive conditions.

The shortened service life of the standard single prebulged rupturing disc, when used under the exacting conditions mentioned above is primarily due to the high inertia in the case of fast positive and negative pressure cycles, in some cases at normal, but in most cases at extreme temperatures, causing reversal movement excursions of the extreme center of the standard prebulged rupture disc (at its thinnest section) forming permanently wrinkled mechanical deformation allowing a creep or notch effect and thus shortened service life and premature failure. In some higher ductility metals which have to be used, due to temperature and/or corrosion conditions, this mechanical deformation stresses the center of the disc (thinnest section) beyond its normal yield point even though the ultimate strength is reached at some point previously. This stressing beyond the normal yield point can cause delayed-action final rupture with undesirable conditions.

Attempts have been made to overcome these difficulties by using a dual type rupturing disc having a basic rupturing domed member with segmental slots of approximately $\frac{1}{16}$ inch wide connecting to 2 sets of holes each approximately $\frac{3}{32}$ inch in diameter. One set of holes is located around the lower periphery and the other close to the central portion of upper periphery section of the domed disc. The chordal pitch spacing of metal between the holes at the upper or central periphery section, plus the strength of the metal involved, in conjunction with an appreciably thinner, low strength sealing member, suitably domed to match the inner surface of the drilled and segmental slotted main disc, determines the rupturing pressure of this type of "dual" rupturing disc. In this type of construction with segmental slots and holes it becomes vital to reduce the amount of abrasion or mechanical deformation of the primary lower strength seal that occurs during pressure cycles. These pressure cycles alternately force the lower pressure thin seal outer dome surface into contact with the adjacent slots and hole sides in the inner side of the top member causing sufficient abrasion to destroy the normal strength of the seal material, before the required rupturing pressure is reached. In an endeavour to avoid this condition, "protector" members consisting of multiple strips or suitably designed one-piece segmental designed metal or other material protector members are fixed to the inner surface of the drilled and slotted main dome disc so as to reduce the abrasion condition as much as possible.

However, such "protective" members do not entirely prevent the lower strength seal for deformation and reduced service life as these "protective members" being attached to the inner circular dome and becoming a fixed part of the slotted and drilled hole main disc, under pressure force the lower strength seal against the "protective members" causing mechanical deformation. As the loss of strength and service life in the lower strength seal due to such deformation cannot be accurately calculated, it becomes necessary to provide such a "dual disc" assembly free from slot, hole or abrasion "protectors" for maximum life service at the required rupturing pressure.

*Applicant's Development*

The applicant has now developed a new concept of rupture disc assembly. This assembly includes a dome-shaped rupture disc having an unweakened rupturable dome adapted to withstand a major proportion of the required rupturing pressure, in combination with a support having a weakened dome adapted to support only a minor proportion of the required rupturing pressure. This contrasts with the prior art where the support bears the major proportion of the rupturing pressure and the diaphragm only a minor proportion.

In carrying out the invention, the applicant has developed a preferred structure. The support has a dome-shaped wall provided with a plurality of fissures, preferably symmetrically arranged to converge inward from an unbroken outer margin to a terminal central area desirably so as to define a plurality of tapering sections. This structure is substantially along the lines of that disclosed in the applicant's Canadian Patent 592,706, dated February 16, 1960, the disclosure of which is hereby incorporated by reference. Each fissure extends completely through the wall with the sides of the adjacent sections touching each other, to provide a substantially continuous supporting surface weakened at the fissures to allow the sections to part ("blow out") under pressure. Preferably, there is a center piece non-integral with the dome of the support inset in a central opening therein and surrounded by a fissure. In supports, according to the invention, of smaller diameters (say overall diameter up to 3 inches, for example, the central opening may be quite small, for instance, approximately $\frac{1}{32}$ inch. In this case the opening is not filled with a central button, but left open. The fissures, in this case, may either join the central opening, or be separated from it by a narrow ligament of the support metal, for example, say about $\frac{1}{32}$ inch from fissure to opening. The central fissure is either joined to the converging fissures or separated from them by a narrow collar. A concavo-convex cap surmounts the center part of the dome portion and is held to the sections by clips, desirably welded to the sections.

The invention has been generally described and it will now be referred to in more detail by reference to the accompanying drawings, which illustrate preferred embodiments of it, and in which:

FIGURE 1 is a perspective view partly in section of a rupture disc assembly according to the invention and a suitable holding mechanism.

FIGURE 2 is a top plan view of the domed support member in the assembly of FIGURE 1.

FIGURE 3 is a cross-section along the line 3—3 of FIGURE 2.

FIGURE 4 is a bottom view of the domed support member of FIGURE 2.

FIGURE 5 is a cross-section through the one-piece rupture disc used in the assembly of FIGURE 1.

Referring more particularly to the drawings, the dome member A is formed of relatively thin, light-weight, non-corrosive metal drawn to shape to provide a central dome portion 50 and anchoring flange 53. The flange 53 extends from the dome portion 50 in a rounding curve portion 55 corresponding with the curvature of the face of the connecting member which bears against it in use. The crown of the dome portion 50 has a small central opening 61 filled by a button of metal 63. The dome portion is also provided with a plurality of fissures 65, 67, 69, 71, 73 and 75 which extend from a peripheral connecting margin of the dome to a central terminal portion. The fissures may either join the circular fissure 61 surrounding the button 63, as shown in the drawings, or, these fissures may be spaced from the circular fissure by an unbroken portion of the dome, as shown in the preferred structure shown as an example in applicant's prior Canadian Patent 592,706.

These fissures are formed by acting on the domed metal vacuum support blank with a slitting tool to provide radial slits in the blank extending from adjacent its periphery to adjacent the center of the dome, thereby dividing the blank into a number of segments. The slitting action displaces the metal at the edges of one segment slightly out of the plane of the adjacent segment. The blank is then reformed to replace the displaced metal to the position it had in the unslitted blank, leaving only a fissure between the edges of the adjacent segments in which the edges touch each other so that the surface of the support is substantially uninterrupted. Thus, the severed adjacent edges are in contact with each other and the surfaces of the dome in that portion are flush as they were before slitting, as no metal is removed during the slitting operation. The fissures provide weakened lines in the metal which can separate under pressure into segments but when in normal position present an almost continuous surface with no openings as in the case of the slots.

A concavo-convex cap B overlies the central portion of the dome. This cap is held in place by a plurality of clips 91, 91a, 91b, etc. having body portions spot-welded to the respective segments and ring portions 93, 93a, etc. overlapping the margins of the cap B.

The button 63 is employed, where required for manufacturing, but is not necessary in all cases. Where it is employed, it is suitably fixed to the circular cap support B to provide a continuous smooth inner domed surface against which the main seal C, to be described, is assembled. Spot welds are applied where indicated.

The main seal C, adapted to withstand positive pressure, is a one-piece, non-perforated disc having a dome portion 150, a laterally extending flange 153 and a rounded connecting portion 155, all of which are adapted to bear against corresponding portions of the member A. Unlike previous "dual discs," the member C is not made of low-strength materials, but of the same material strength and design as might be used for a standard rupture disc. This means mechanical strength and hence longer service life. Because of the normal additional thickness of its center dome portion, compared with low-strength seal designs, it has the desired advantage of reducing to a minimum any creep or mechanical deformation while under extreme temperature or cycling pressure.

During manufacture for use, the segmented top dome section A of the required strength is assembled with a cap B, clips 91, etc., and possibly the button 63. The underside of the dome portion 50 of part A is then polished and finished to present a continuous flawless surface to the outer dome surface of the main seal C.

These parts are then assembled together in a suitable holding means.

The construction described provides for maximum rupturing strength in seal C with parts A, B and 91 etc., acting as restraining members to prevent the upward movement of seal C when under extreme temperature or pressure cyclic conditions.

However, the complete assembly is designed so that the assembled rupturing strength of parts A, B, 91 etc., and possibly 63 are of a minor nature insofar as the desired rupturing pressure is concerned and merely act as a cyclic or temperature creep-restricting force to seal C, which is the main rupturing member. The strength and assembly of parts A, B, 91, etc., and possibly 63 are designed and so manufactured that, when the rupturing pressure of main seal C is reached and rupture occurs, the segmental sections of part A open upwards with little restraint, thus allowing reasonably full pipe bore pressure relief for positive pressures.

In cases where negative and positive pressures are both involved the above described "dual disc" is provided with a vacuum support similar to that of Canadian Patent 592,706 to support the main member part C against reversal under negative pressure.

To give an indication as to the quantitative aspects of the applicant's design, the following reference is given. Previous types using slots (protectors i.e. slats over the slots) with two sets of holes, have central holes being arranged as to circumference and diameter to allow the break-away for rupture purposes. In this case, the rupture disc would preferably consist of .003 inch thick suitable low strength metal with a top section fabricated from approximately .020 inch thick high strength material. Using the applicant's preferred design the disc would be of .010 inch thick high strength metal or material for the seal and a support section fabricated from .015 inch material. This thickness in the support section is not necessary for rupturing strength purposes but would be used for ease of manufacturing. While the strength requirement would possibly be satisfactory with .005 inch thick material it is preferable to use the thicker section top material to provide good welding and other fabricating requirements.

In its broader aspects, the dome member A can be of other forms than specifically shown in the preferred constructions illustrated and described. In other words, its wall may be weakened by slots, holes or other expedients. However, the preferred dome member as described, is infinitely superior, because no reinforcing members are needed to prevent the material of the main seal C from being forced by mechanical deformation into the openings, the fissures of the member A shown in the drawings presenting no perceptible opening or protuberance to render the surface which receives the dome of the member C other than smooth.

I claim:

1. A rupturing disc assembly, comprising, a domed rupturing disc having an integral unweakened domed portion, and a support member having a dome-shaped rupturing disc support, comprising, an integral thin body having a dome-shaped wall finished to conform to the convex side of the dome-shaped surface of the rupturing disc, a plurality of fissures through the wall converging inward from an unbroken outer marginally connecting portion to a narrow central terminal portion, said fissures dividing said wall into a plurality of sections extending between said connecting and terminal portions, each fissure extending completely through the wall with the sides of the adjacent fissures touching whereby the wall provides a substantially continuous supporting surface weakened at the fissures to allow the sections to part under pressure, said terminal portion including a circular button concentric with said wall and touching the ends of the sections across an intervening circular fissure, a concavo-convex strengthening cap of minor area resting on the convex side of said wall to overlie said terminal portion, and means extending from said sections for retaining said cap in place, and means for holding said disc and support in juxtaposed relationship, the rupturing disc being calibrated to withstand the major proportion of the normally required rupturing pressure, the support being calibrated to withstand a minor proportion of said pressure.

2. The rupturing disc assembly of claim 1 wherein the means for holding said disc and support in juxtaposed relationship includes a holding mechanism.

3. The rupturing disc assembly of claim 1 wherein said rupturing disc is metal having strength of an order used for a standard rupture disc.

4. The rupturing disc assembly of claim 1 wherein said plurality of fissures join said narrow central terminal portion.

5. A rupturing disc assembly, comprising, the assembled combination of a domed rupturing disc having an integral unweakened domed portion with a support member having a dome-shaped rupturing disc support, said support member comprising an integral thin body having a dome-shaped wall finished to conform to the convex side of the dome-shaped surface of the rupturing disc, a plurality of fissures through the wall converging inward from an unbroken outer marginally connecting portion to a narrow central terminal portion, said fissures dividing said wall into a plurality of sections extending between said connecting and terminal portions, each fissure extending completely through the wall with the sides of the adjacent fissures touching whereby the wall provides a substantially continuous supporting surface weakened at the fissures to allow the sections to part under pressure, said terminal portion including a circular button concentric with said wall and touching the ends of the sections across an intervening circular fissure, a concavo-convex strengthening cap of minor area resting on the convex side of said wall to overlie said terminal portion, and means extending from said sections for retaining said cap in place, the rupturing disc being calibrated to withstand the major proportion of the normally required rupturing pressure, the support being calibrated to withstand a minor proportion of said pressure.

References Cited in the file of this patent

UNITED STATES PATENTS

| | | |
|---|---|---|
| 2,548,744 | Simms | Apr. 10, 1951 |
| 2,875,921 | Coffman | Mar. 3, 1959 |
| 2,980,286 | Coffman | Apr. 18, 1961 |